United States Patent [19]

Saleem

[11] Patent Number: 4,690,807
[45] Date of Patent: Sep. 1, 1987

[54] PROCESS FOR THE SIMULTANEOUS ABSORPTION OF SULFUR OXIDES AND PRODUCTION OF AMMONIUM SULFATE

[75] Inventor: Abdus Saleem, Leola, Pa.

[73] Assignee: General Electric Environmental Services, Inc., Lebanon, Pa.

[21] Appl. No.: 831,381

[22] Filed: Feb. 20, 1986

Related U.S. Application Data

[63] Continuation-in-part of Ser. No. 765,774, Aug. 15, 1985, abandoned.

[51] Int. Cl.$^4$ .......................... C01B 17/00; C01C 1/24
[52] U.S. Cl. ..................................... 423/242; 423/545
[58] Field of Search .......... 423/242 A, 242 R, 244 A, 423/244 R, 545

[56] References Cited

U.S. PATENT DOCUMENTS

| | | | |
|---|---|---|---|
| T909,017 | 4/1973 | Jordan et al. | 423/242 |
| 1,986,889 | 1/1935 | Fulton | 23/119 |
| 3,186,802 | 6/1965 | Gerrard | 423/242 |
| 3,676,059 | 7/1972 | Welty, Jr. | 423/547 |
| 3,843,789 | 10/1974 | Spector et al. | 423/242 |
| 3,983,217 | 9/1976 | Muraki et al. | 423/545 X |
| 4,039,304 | 8/1977 | Bechthold et al. | 55/73 |
| 4,213,945 | 7/1980 | Haese et al. | 423/545 |
| 4,250,160 | 2/1981 | Eakman | 423/547 |
| 4,268,489 | 5/1981 | Haese | 423/545 |
| 4,430,303 | 2/1984 | Linde | 55/73 |

FOREIGN PATENT DOCUMENTS 57-121387  7/1982  Japan .

Primary Examiner—Gregory A. Heller
Attorney, Agent, or Firm—Ernest F. Chapman

[57] ABSTRACT

Process and apparatus for the removal of sulfur oxides from sulfur oxide-containing gas with simultaneous production of ammonium sulfate. The process is carried out in a single vessel having an ammonium sulfate scrubbing zone; an ammonium sulfate liquor reservoir having a neutralization zone, a sulfur oxide oxidation zone, and a product removal zone; and a scrubbed gas removal zone. The sulfur oxide-containing gas is introduced into the ammonium sulfate scrubbing zone and passes countercurrent to droplets or a spray of ammonium sulfate liquor. The ammonium sulfate liquor absorbs the sulfur oxide in the scrubbing zone, and the liquor having the absorbed sulfur oxide therein collects in the ammonium sulfate liquor reservoir where aqueous ammonia is introduced into the neutralization zone and an oxygen-containing gas is introduced into the sulfur oxide oxidation zone. The sulfur oxide is converted to ammonium sulfate which is circulated from the ammonium sulfate liquor reservoir to the ammonium sulfate scrubbing zone. Ammonium sulfate product is removed from the product removal zone.

26 Claims, 2 Drawing Figures

PROCESS FOR THE SIMULTANEOUS ABSORPTION OF SULFUR OXIDES AND PRODUCTION OF AMMONIUM SULFATE

CROSS REFERENCE TO RELATED APPLICATION

This application is a continuation-in-part application of U.S. Pat. application Ser. No. 765,774 filed Aug. 15, 1985 now abandoned.

BACKGROUND OF THE INVENTION

The present invention relates to an improved apparatus and process for the removal of sulfur oxide from sulfur oxide-containing gases, and more particularly, to an improved apparatus and process for the simultaneous absorption of sulfur dioxide and production of ammonium sulfate from gas containing sulfur dioxide.

Sulfur dioxide emission control from such sources as fossil fuel fired boilers, smelters, sulfuric acid plants, pulp and paper mill operations and the like is required by law in many countries to mitigate the serious environmental and health damage that is associated with sulfur dioxide. The most widely practiced method for sulfur dioxide control is based upon limestone or lime contact with flue gases in the form of aqueous slurry. In most instances, the by-product is either discarded as a land fill or converted into gypsum for use in wall board and cement manufacture. In a few instances, other alkaline reagents, such as sodium, magnesium and ammonia have been used with recovery of useful by-products, such as pure sulfur dioxide, sulfuric acid and sulfur.

Use of ammonia and ammoniacal scrubbing solutions for flue gas desulfurization is also well known. Ammonium sulfate is often formed by contact between sulfur oxide containing flue gases and ammoniacal solutions, the ammonium sulfate being formed as crystals and precipitated from solution. In Defensive Publication No. T909,017, sulfur dioxide is removed from stack gases by absorption in ammoniacal solution forming ammonium bisulfite, ammonium sulfite and, unavoidably, ammonium sulfate. The absorber effluent solution may be treated with ammonium bisulfate to form ammonium sulfate and to release a concentrated stream of sulfur dioxide suitable for conversion to sulfuric acid or elemental sulfur. Ammonium sulfate may be crystallized from the solution and thermally decomposed to ammonia for recycle to the absorber and ammonium bisulfate for recycle to the sulfur dioxide release step.

In U.S. Pat. No. 3,186,802, sulfur oxides are removed from waste or flue gas by contact of the gas with ammonia. In a reaction vessel in U.S. Pat. No. 3,186,802, an incoming acidified feed liquor is mixed with a recirculated sulfuric acid containing stream producing a reaction in which ammonium sulfite and ammonium bisulfite are converted to ammonium sulfate and sulfur, and small amounts of sulfuric acid are used to scrub trace amounts of ammonia from the flue gas.

In still another process for the removal of sulfur dioxide from flue gas by contact of the gas with an ammonia solution, flue gas is introduced into the lower portion of a column while the ammonia solution is introduced into the upper portion of the column, the ammonia reacting with the sulfur dioxide to produce ammonium sulfite. This process as described in U.S. Pat. No. 3,843,789 removes the sulfur dioxide to reduce air pollution.

Ammonium sulfate is produced during the separation of sulfur dioxide from a gaseous stream by contacting the gaseous stream with ammonia in the presence of oxygen and water in a multiple stage liquid-vapor contactor or contact device comprised of at least three sections or zones as disclosed in U.S. Pat. No. 4,250,160. In U.S. Pat. No. 4,250,160, in the contactor, in a central section, sulfur dioxide is contacted in vapor phase with an excess of ammonia in the presence of oxygen and water vapor to produce ammonium sulfate. In an upper section of the contactor, excess ammonia is scrubbed from the effluent gas by countercurrent contact with water or acid solution. Liquid cyclones are utilized in the lower section of the contactor, and ammonium sulfate in crystalline form is removed from the lower section of the contactor. A slurry of ammonium sulfate is removed from the bottom stages of the contactor, crystalline ammonium sulfate is separated from the slurry, and the mother liquor is recycled to the contactor. However, the primary purpose of the central section in U.S. Pat. No. 4,250,160 is to provide vapor phase contact between the sulfur dioxide and ammonia, the sulfur dioxide being reacted with an excess concentration of ammonia in the presence of excess oxygen and water vapor to produce ammonium sulfate.

Ammonium sulfate is prepared by introducing an oxidizing gas into a solution containing ammonium sulfite in a closed chamber and by building up the pressure therein to convert a major portion of the sulfite to sulfate, and thereafter discontinuing the introduction of the oxidizing gas and converting the remainder of the sulfite to sulfate by recirculating the gas contained therein under the built-up pressure through the solution in U.S. Pat. No. 1,986,889. In U.S. Pat. No. 1,986,889, the alkalinity or acidity of the ammonium sulfite solution in the column may be controlled by admitting ammonia-containing gas or sulfur dioxide-containing gas into the solution. To prevent deposition of solid ammonium salt after ammonia has been fed into the solution, the ammonia gas is swept out by the oxidizing gas before admitting sulfur dioxide gas, and sulfur dioxide is scrubbed out before ammonia can be admitted.

All of the above processes and devices have been found to be inadequate or inefficient for the removal of sulfur oxides from sulfur oxide-containing gases. Generally, the large scale use of ammonia for flue gas desulfurization has not been commercially practiced due to basic problems. The first problem is the relative expense of ammonia. Because of the expense of ammonia, it must be recycled with sulfur extraction or converted to ammonium sulfate for use as a fertilizer. The current state of the art makes both of these options rather complex to practice, and the commercial plants to carry out the processes are relatively expensive to build. Secondly, ammonia gas tends to escape into flue gases during desulfurization leading to not only economic loss but also generating a visible blue fume in the stack discharge, thus creating a secondary pollution problem. In order to overcome this disadvantage and to control ammonia loss and blue fume, rather complex scrubbing systems which are expensive to operate, have been proposed.

SUMMARY OF THE INVENTION

Accordingly, it is an object of the present invention to overcome the prior art disadvantages discussed above.

It is the primary object of the present invention to provide an improved process and apparatus for the removal of sulfur oxide from sulfur oxide-containing gaseous streams.

It is another object of the present invention to provide a process and apparatus for the simultaneous absorption of sulfur oxide from sulfur dioxide-containing gas streams and the production of ammonium sulfate.

It is another object of the present invention to provide a process and apparatus for the separation of sulfur dioxide from waste gases with ammonia without the necessity of vapor phase contact between the sulfur dioxide and ammonia.

These and other objects are achieved in accordance with the present invention where gases containing at least one sulfur oxide are treated with aqueous ammonia, and ammonium sulfate is produced in a single vessel comprising an absorption tower and a liquor reservoir. The sulfur oxide gas or gases are removed from gases containing sulfur oxides by contact of the gas with an aqueous solution of ammonium sulfate. As the sulfur oxide gas such as sulfur dioxide, is absorbed by the ammonium sulfate solution, it becomes acidic. The acidic solution is neutralized by injection of ammonia into the ammonium sulfate solution to maintain a desired pH level sufficient to prevent excessive ammonia loss. An oxidizing medium, such as air, is injected into the neutralized ammonium sulfate solution containing the absorbed sulfur oxide gas, leading to the formation of ammonium sulfate. The ammonium sulfate product can be withdrawn as a suspension of ammonium sulfate crystals, as a saturated solution and/or as a less-than-saturated solution of sodium sulfate. In any case, the recovered ammonium sulfate can be further recrystallized and/or dewatered and dried for ease of handling and storage. The ammonium sulfate product can be used as a fertilizer directly or mixed with other fertilizers.

As used herein, sulfur oxides are generally referred to, for the sake of convenience, as sulfur dioxide.

DETAILED DESCRIPTION OF THE INVENTION

In the present invention, gases containing at least one sulfur oxide are treated for the removal of the sulfur oxide therefrom by passing them through a spray or mist (in the form of droplets) of aqueous ammonium sulfate to form an aqueous ammonium sulfate having sulfur oxides absorbed therein and a scrubbed gas. The aqueous ammonium sulfate having the sulfur oxides absorbed therein is collected in a reservoir, generally referred to herein as an ammonium sulfate liquor reservoir. Ammonia, generally an aqueous ammonia, is introduced into the aqueous ammonium sulfate having sulfur oxide gas absorbed therein. The aqueous ammonia may be introduced into the aqueous ammonium sulfate at various portions of the system, but preferably in the aqueous ammonium sulfate liquor reservoir and/or in the system which circulates the aqueous ammonium sulfate liquor from the reservoir to the ammonium sulfate scrubbing zone. The aqueous ammonia reduces the acidity of the aqueous ammonium sulfate liquor having sulfur dioxide absorbed therein. The aqueous ammonium sulfate treated with aqueous ammonia and having reduced acidity is referred to herein as neutralized ammonium sulfate liquor. An oxidizing gas, generally, an oxygen-containing gas, such as air, is introduced into the aqueous ammonium sulfate having sulfur dioxide absorbed therein in the ammonium sulfate liquor reservoir whereby ammonium sulfate product is formed in the reservoir by the reaction of the absorbed sulfur oxide gas with the ammonia in the aqueous ammonia and with the oxygen in the oxygen-containing gas.

The spray of aqueous ammonium sulfate through which the gases containing sulfur oxides are passed, is formed from aqueous ammonium sulfate liquor removed from the ammonium sulfate liquor reservoir and circulated by suitable means, such as pumps, through suitable conduits, such as pipes. Scrubbed gas and aqueous ammonium sulfate product are withdrawn from the system.

In one aspect of the present invention, there is provided a process for the removal of sulfur dioxide from a sulfur dioxide-containing gas and the simultaneous production of ammonium sulfate in a vessel having (1) an ammonium sulfate scrubbing zone; (2) an ammonium sulfate liquor reservoir having a sulfur dioxide oxidation zone, a neutralization zone, and a product removal zone; and (3) a scrubbed gas removal zone, comprising, introducing a sulfur dioxide-containing gas into the ammonium sulfate scrubbing zone; introducing aqueous ammonium sulfate liquor circulated from the ammonium sulfate liquor reservoir into the ammonium sulfate scrubbing zone whereby the sulfur dioxide in the sulfur dioxide-containing gas is absorbed by the aqueous ammonium sulfate liquor to form a scrubbed gas; withdrawing scrubbed gas from the scrubbed gas removal zone; collecting the aqueous ammonium sulfate liquor having sulfur dioxide absorbed therein in the ammonium sulfate liquor reservoir; introducing aqueous ammonia into the neutralization zone in the ammonium sulfate liquor reservoir; introducing an oxygen-containing gas into the sulfur dioxide oxidation zone in the ammonium sulfate liquor reservoir to oxidize absorbed sulfur dioxide leading to the formation of ammonium sulfate; and removing ammonium sulfate product from the product removal zone of the ammonium sulfate liquor reservoir. The ammonium sulfate product may be crystalline ammonium sulfate, a saturated solution of ammonium sulfate and/or a less than saturated solution of ammonium sulfate. In preferred embodiments, the solution of ammonium sulfate circulated from the ammonium sulfate liquor reservoir to the ammonium sulfate scrubbing zone is saturated ammonium sulfate. When the ammonium sulfate product contains ammonium sulfate crystals, the product is generally referred to as an ammonium sulfate slurry because it is a mixture of ammonium sulfate liquor and ammonium sulfate crystals.

In another aspect of the present invention, there is provided a process for the removal of sulfur dioxide from a sulfur dioxide-containing gas and the simultaneous production of ammonium sulfate in a vessel having (1) an ammonium sulfate scrubbing zone; (2) an ammonium sulfate liquor reservoir having a sulfur dioxide oxidation zone and a product removal zone; and (3) a scrubbed gas removal zone, comprising, introducing a sulfur dioxide-containing gas into the ammonium sulfate scrubbing zone; introducing aqueous ammonium sulfate liquor circulated from the ammonium sulfate liquor reservoir into the ammonium sulfate scrubbing zone whereby the sulfur dioxide in the sulfur dioxide-containing gas is absorbed by the aqueous ammonium sulfate liquor to form a scrubbed gas; withdrawing scrubbed gas from the scrubbed gas removal zone; collecting the aqueous ammonium sulfate liquor having sulfur dioxide absorbed therein in the ammonium sulfate liquor reservoir; introducing aqueous ammonia into the aqueous ammonium sulfate liquor circulated from the ammonium sulfate liquor reservoir into the ammonium sulfate scrubbing zone to reduce the acidity of the aqueous ammonium sulfate liquor; introducing an oxygen-containing gas into the sulfur dioxide oxidation zone in the ammonium sulfate liquor reservoir to oxidize absorbed sulfur dioxide leading to the formation of ammonium sulfate; and removing ammonium sulfate product.

Aqueous ammonia is injected into the ammonium sulfate solution at any suitable point or points in the system where it reduces the acidity of the aqueous ammonium sulfate liquor. It is generally preferred that the aqueous ammonia be introduced into the system at a point where the ammonia does not form or contribute to the formation of blue fume in the absorption tower or in the scrubbed gas as it exits from the absorption tower. Thus, aqueous ammonia should not be introduced into the system at a point where there will be inadequate reaction time between the ammonia and the acidic aqueous ammonium sulfate having sulfur dioxide absorbed therein so that unreacted ammonia will escape from the scrubbing process.

As discussed above, in one embodiment of the present invention, the ammonia is injected into the ammonium sulfate solution in the zone in which the aqueous ammonium sulfate liquor is circulated from the ammonium sulfate liquor reservoir into the ammonium sulfate scrubbing zone. In this embodiment, the acidity of the aqueous ammonium sulfate liquor having sulfur dioxide absorbed therein is reduced in the circulation system, that is, in the pipes and tubing prior to the introduction of the aqueous ammonium sulfate liquor into the ammonium sulfate scrubbing zone.

In another embodiment, the ammonia is injected into the ammonium sulfate solution in a zone in the ammonium sulfate liquor reservoir designated herein as the neutralization zone. In preferred embodiments, the amount of ammonia, generally in the form of aqueous ammonia, injected into the ammonium sulfate solution is that amount which is sufficient to maintain a pH level in the ammonium sulfate solution of less than about 6.0 and preferably less than about 5.5. Depending upon various factors including the reaction conditions, the particular scrubbing tower, the concentration of the aqueous solutions, and the like, one skilled in the art can adjust the pH by controlling the concentration and/or amount of aqueous ammonia introduced into the system to achieve the most efficient sulfur dioxide removal while eliminating or reducing blue fume formation. Higher pH levels cause excessive ammonia loss from the solution, and the formation of blue fume in the stack gas. Thus, by the improved process and apparatus of the present invention, blue fume in stack gas, and the loss of expensive ammonia, is easily avoided. The zone in which the ammonia is injected into the ammonium sulfate solution in the ammonium sulfate liquor is designated as the neutralization zone because it is the region where the ammonium sulfate solution containing absorbed sulfur dioxide, and having become acidic by the absorption of the sulfur dioxide therein, is neutralized to maintain a pH level which will prevent the loss of ammonia and the formation of the blue fume in the stack gas. Thus, the neutralization by the injection of ammonia into the ammonium sulfate reduces the acidity of the ammonium sulfate solution having sulfur dioxide absorbed therein so that it becomes less acidic, but generally not less acidic than a pH of about 6.0 and preferably not less acidic than a pH of about 5.5. The neutralization zone is located at any point in the reservoir or in the liquor circulation system between the reservoir and the ammonium sulfate scrubbing zone. The neutralization zone, that is, the zone in which aqueous ammonia is injected into the ammonium sulfate solution, must be in the ammonium sulfate liquid. The injection of the aqueous ammonia into the reservoir or circulation system may be carried out continuously or intermittently by means well-known in the art to obtain the desired acidity control. Suitable pH monitors and flow meters may be used to achieve the desired acidity.

Simultaneously with the injection of ammonia into the ammonium sulfate solution, an oxidizing gas, such as air, is injected, by injection means separate from the means for injecting aqueous ammonia, into the ammonium sulfate solution to oxidize the sulfur dioxide absorbed in the ammonium sulfate solution. This oxidation leads to the formation of ammonium sulfate by well-known reaction mechanisms. It is generally preferred to inject the air into the reservoir continuously in order to insure a sufficient amount of oxidizing agent in the sulfur dioxide oxidation zone to oxidize the sulfur dioxide to the sulfate form, and to prevent the formation of the less oxidized forms of sulfur dioxide. The sulfur dioxide oxidation zone in the ammonium sulfate liquor reservoir is generally located between the bottom reservoir which contains the product removal zone, and the neutralization zone. As the air is injected into the ammonium sulfate solution to oxidize the absorbed sulfur dioxide, the ammonium sulfate solution becomes increasingly saturated in this particular zone, and depending upon the amount of make-up water added to the ammonium sulfate solution, the ammonium sulfate product approaches a saturated solution, becomes a saturated solution and/or forms ammonium sulfate crystals which are generally suspended in the solution. Thus, the water is added to adjust the concentration of ammonium sulfate in the aqueous ammonium sulfate liquor. In preferred embodiments, the water is added to the ammonium sulfate liquor reservoir along with the aqueous ammonia. However, make-up water may be added to the system at any point as desired.

The ammonium sulfate product is withdrawn from the product removal zone of the ammonium sulfate liquor reservoir. As discussed above, the product removal zone is generally located at the bottom or near the bottom of the vessel below the sulfur dioxide oxidation zone. The ammonium sulfate solution (product) may be agitated in the area of the product removal zone by any suitable agitating means such as one or several stirrers. By agitating the ammonium sulfate solution in the product removal zone, a slurry of ammonium sulfate crystals is maintained in the ammonium sulfate solution, and the deposition of ammonium sulfate crystals is prevented in the bottom of the reservoir. The ammonium sulfate product can be removed from the product removal zone by any suitable manner, such as by a pump or by gravity removal means located at the bottom of the reservoir. Any crystals contained in the ammonium sulfate product can be easily removed for example, by filtration. Furthermore, the product can be re-crystallized and/or dewatered and dried for ease of handling and storage.

The process of the present invention is easily carried out in a single vessel and is easily carried out in a continuous mode. Flue gas or any other sulfur oxide-containing gas from any other source is introduced into the scrubbing zone and is directed countercurrent to the flow of the aqueous ammonium sulfate liquor.

Generally, the apparatus of the present invention for the simultaneous removal of sulfur oxide gas from sulfur oxide-containing gases and production of ammonium sulfate includes a sulfur oxide absorption tower having an ammonium sulfate scrubbing zone; an ammonium sulfate liquor reservoir having a sulfur oxide oxidation zone, optionally a neutralization zone and an ammonium sulfate product removal zone; a sulfur oxide-containing gas introduction zone and a scrubbed gas removal zone; means for passing sulfur oxide-containing gas from the sulfur oxide-containing gas introduction zone to the scrubbed gas removal zone countercurrent to the flow of ammonium sulfate liquor in the ammonium sulfate scrubbing zone; means for passing ammonium sulfate liquor from the ammonium sulfate liquor reservoir to the ammonium sulfate scrubbing zone; means for removal of ammonium sulfate product from the ammonium sulfate product removal zone; means for introducing oxidizing gas into the sulfur oxide oxidation zone; and means for passing aqueous ammonia into the neutralization zone. The neutralization zone is preferably located in the ammonium sulfate liquor reservoir, however, it may also be located in the means for passing ammonium sulfate liquor from the ammonium sulfate liquor reservoir to the scrubbing zone, or at any other situs where aqueous ammonia can be introduced into the appapratus without promoting the production of blue fume.

The apparatus may also include means for agitating the liquor in the ammonium sulfate liquor reservoir. In preferred embodiments, the means for agitating the liquor in the ammonium sulfate liquor reservoir is in the ammonium sulfate product removal zone.

In accordance with the present invention, a mist eliminator may be suitably located between the ammonium sulfate scrubbing zone and the scrubbed gas removal zone to prevent the passage of ammonium sulfate liquor into the scrubbed gas removal zone.

In general, the absorption system of the present invention comprises a sulfur dioxide absorption tower located above a slurry recycle tank or liquor reservoir in such a manner that recycle slurry or recycle liquor from the absorption tower freely falls by gravity to the top of the liquor contained in the recycle tank or reservoir. The agitation of the liquor in the reservoir is provided only to prevent solids from settling on the bottom of the reservoir, and by controlling or adjusting the amount of agitation, the backward flow of the slurry or liquor in the bottom of the reservoir is substantially suppressed, and the ammonium sulfate liquor gradually moves from the top of the reservoir to the bottom of the reservoir which permits the pH value of the ammonium sulfate solution in the reservoir to gradually increase by the neutralization of the sulfur dioxide absorbed in the ammonium sulfate solution as the ammonium sulfate solution descends from the top of the reservoir to the bottom of the reservoir in those embodiments where aqueous ammonia is introduced into the reservoir, while simultaneously in the reservoir, an oxidizing medium, such as air, is introduced in an amount sufficient to oxidize the sulfur dioxide in the ammonium sulfate solution.

Figure 1:
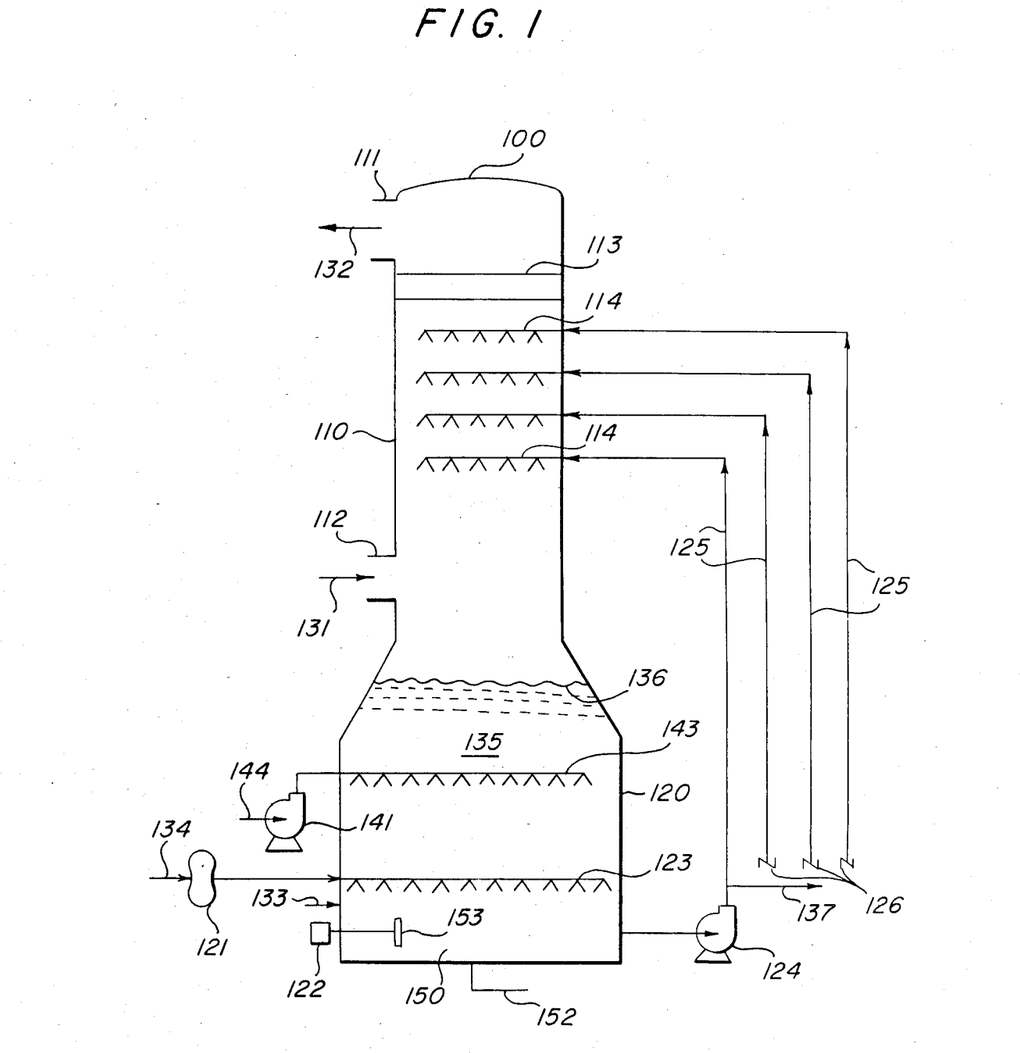
FIG. 1 depicts in schematic form a sulfur dioxide absorption system forming an integral structure with a recycle and product removal reservoir.

In FIG. 1, the sulfur dioxide absorption system 100 consists of sulfur dioxide absorption tower 110 and ammonium sulfate liquor reservoir 120. The sulfur dioxide absorption tower 110 is vertical and a flue gas inlet duct 112 and scrubbed gas outlet duct 111 are located in the absorption tower in such a manner that the flue gas passes countercurrent to the spray generated at spraying system 114 in sulfur dioxide absorption tower 110.

Mist eliminator 113 is located below the flue gas outlet duct 111 in absorption tower 110 in order to separate mist entrained in the flue gas after sulfur dioxide absorption in the ammonium sulfate scrubbing zone located generally in the spraying system designated by numerals 114. Spraying system 114 generally sprays ammonium sulfate liquor, preferably in the saturated form, recycled from ammonium sulfate liquor reservoir 120 downwardly in the form of droplets or spray of aqueous ammonium sulfate so that sulfur dioxide gas is absorbed into the ammonium sulfate solution. The spraying system 114 is installed in absorption zone 110. Any appropriate spraying mechanism or system can be used in the ammonium sulfate scrubbing zone to produce a spray or droplets of ammonium sulfate solution or liquor suitable for scrubbing the sulfur dioxide gas from the flue gas. One such optional system is a multi header spraying nozzle mechanism.

Ammonium sulfate liquor reservoir 120 is preferably continuous with the absorption tower 110 and forms an integral structure as shown in the drawing. In the embodiment shown in FIG. 1, the ammonium sulfate liquor reservoir 120 is flared in the area where it joins the sulfur dioxide absorption tower 110. In all cases in the present invention, the absorption zone 110 is located above the ammonium sulfate liquor reservoir 120 so the ammonium sulfate solution having sulfur dioxide absorbed therein falls freely from the sulfur dioxide absorption zone to the ammonium sulfate liquor reservoir without any substantial interference or restrictions. Any suitable vessel or tank can be used in the process of the present invention as long as it permits the ammonium sulfate solution having sulfur dioxide absorbed therein in an absorption tower to fall freely from the absorption tower to the ammonium sulfate liquor reservoir.

Thus, as used herein, the ammonium sulfate scrubbing zone is generally that zone in the absorption tower 110 in the vicinity of spraying system 114 and extends from the uppermost part of the spraying system 114 to the top 136 of the liquor 135 held in the ammonium sulfate liquor reservoir 120. The surface of the liquor 135, or the liquor level in ammonium sulfate liquor reservoir 120, is designated by the numeral 136.

The ammonium sulfate liquor reservoir 120 is generally made up of three zones, namely, a utralization zone in the area of aqueous ammonium injection system 143, a sulfur dioxide oxidation zone in the area of air injection system 123, and a product removal zone generally designated at the bottom of the reservoir by numeral 150. Agitator 122 is generally used to prevent ammonium sulfate crystals from settling on the bottom of reservoir 120 and to keep the bottom of the reservoir substantially free of any settled ammonium sulfate crystals. Agitator 122 is adjustable or controllable in the area of the reservoir designated by numeral 150. Agitator 122 has an impeller 153 which is preferably designed to prevent back mixing of the contents of the reservoir.

The agitator 122 may be equipped with a plurality of impellers (not shown) for example, four units mounted on the side walls near the bottom of the reservoir 120.

Air is injected into ammonium sulfate liquor reservoir 120 by air injection system 123. As shown, air injection system 123 consists of an air sparger arranged in a network of perforated pipes and receives oxidizing air from air blower 121 through suitable conduits 134.

As described in detail above, the pH is maintained in the reservoir to decrease the acidity of the sulfur dioxide absorbed in the ammonium sulfate solution. Aqueous ammonia injection system 143 consists of a sparger arranged in a network of perforated pipes and receives aqueous ammonia from pump 141 through suitable conduits 144. Any suitable sparger system or conduits may be utilized to inject the air and aqueous ammonia into the reservoir. As indicated above, make-up water may also be provided to the reservoir through the aqueous ammonia injection system 143.

Ammonium sulfate liquor, after it has been formed in the ammonium sulfate liquor reservoir 120 by the reaction of the ammonia, the sulfur dioxide absorbed in the ammonium sulfate solution and the oxidizing air, most of which takes place in reservoir 120, is recycled by recycle pump 124 through suitable conduits 125 from the bottom or near the bottom of the reservoir 120 to absorption tower 110 where it is provided for the absorption of sulfur dioxide in the flue gas as described in detail above.

As shown in FIG. 1, flue gas 131 is introduced through gas inlet duct 112 and passes up into absorption tower 110, countercurrently contacting the ammonium sulfate solution sprayed by spraying system 114. The sulfur dioxide contained in the flue gas is absorbed by the ammonium sulfate solution and passes downwardly onto the surface of the liquor in reservoir 120. The flue gas having the sulfur dioxide removed therefrom, that is, the scrubbed flue gas, is exhausted to the atmosphere or to other suitable devices through mist eliminator 113 and outlet duct 111. The scrubbed flue gas is designated by numeral 132 as it exits outlet duct 111.

As indicated above, ammonium sulfate liquor is recirculated from the reservoir, by use of pumps, to spray banks which break up the ammonium sulfate liquor into droplets. The gas to be desulfurized, that is, the flue gas, is introduced above the liquor reservoir and rises countercurrent to the falling droplets of ammonium sulfate liquor which absorbs sulfur dioxide. The de-sulfurized gas passes through a mist eliminator to remove any entrained droplets and is then ready for discharge to the stack with or without re-heat. The sulfur dioxide-laden droplets fall into the reservoir of ammonium sulfate liquor which is aerated by sparging air through a suitable device, such as perforated pipes. Ammonia, in the form of aqueous solution, is added to the reservoir to maintain either a solution of desired strength or ammonium sulfate suspension by allowing crystallization to occur in the reservoir. The product solution or suspension is withdrawn from the reservoir, and a fixed liquid level is generally maintained in the reservoir. The product can be placed in a storage pit or tank (not shown) where it can be later removed for further processing. Product can be withdrawn at any suitable point in the system, such as from conduit 152 located in the bottom of the tank or from conduit 137 connected to pump 124. In certain embodiments, it may be desirable to provide reservoir 120 with a tapered or funnel-shaped bottom (as shown in FIG. 2) to facilitate the removal of crystalline ammonium sulfate from the reservoir.

Figure 2:
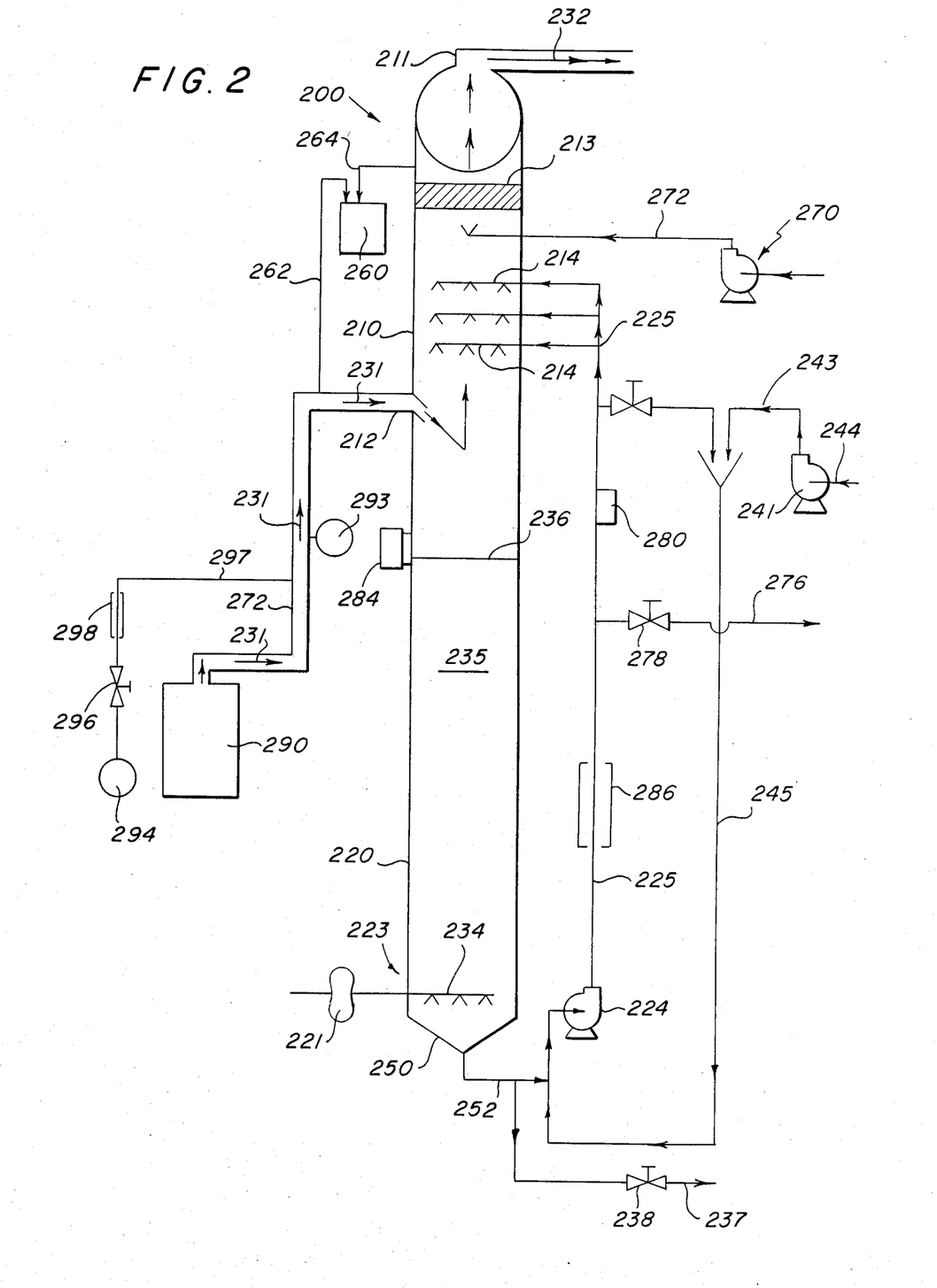
FIG. 2 depicts in schematic form an alternative sulfur dioxide absorption system forming an integral structure with a recycle and product removal reservoir.

Referring to FIG. 2, the sulfur dioxide absorption system 200 consists of sulfur dioxide absorption tower 210 and ammonium sulfate liquor reservoir 220. The sulfur dioxide absorption tower 210 is vertical and a flue gas inlet duct 212 and scrubbed gas outlet duct 211 are located in the absorption tower in such a manner that the flue gas passes countercurrent to the spray generated at spraying system 214 in sulfur dioxide absorption tower 210.

Mist eliminator 213 is located below the flue gas outlet duct 211 in absorption tower 210 in order to separate mist entrained in the flue gas after sulfur dioxide absorption in the ammonium sulfate scrubbing zone located generally in the spraying system designated by numerals 214. Spraying system 214 generally sprays ammonium sulfate liquor, preferably in the saturated form, recycled from ammonium sulfate liquor reservoir 220 and having aqueous ammonia added thereto by aqueous ammonia injection system 243 through the aqueous ammonium sulfate circulating system defined by pump 224 and conduit 225. Spraying system 214 generally sprays the liquor downwardly in the form of droplets or spray of aqueous ammonium sulfate/aqueous ammonia so that sulfur dioxide gas is absorbed into the ammonium sulfate solution. Spraying system 214 is installed in absorption zone 210.

Ammonium sulfate liquor reservoir 220 is preferably continuous with the absorption tower 210 and forms an integral structure as shown in FIG. 2. The absorption zone 210 is located above the ammonium sulfate liquor reservoir 220 so that the ammonium sulfate solution having sulfur dioxide absorbed therein falls freely from the sulfur dioxide absorption zone to the ammonium sulfate liquor reservoir without any substantial interference or restrictions.

As used herein, the ammonium sulfate scrubbing zone is generally that zone in the absorption tower 210 in the vicinity of spraying system 214 and extends from the uppermost part of spraying system 214 to the top 236 of liquor 235 held in the ammonium sulfate liquor reservoir 220. The surface of the liquor 235, or the liquor level in the ammonium sulfate liquor reservoir 220, is designated by numeral 236. As shown in FIG. 2, the liquor level of ammonium sulfate liquor 235 is maintained at the appropriate level by liquor level control means 284. Any conventional liquor level control means may be used in the apparatus of the present invention.

Ammonium sulfate liquor reservoir 220 is generally made up of two zones in FIG. 2, namely, a sulfur dioxide oxidation zone in the area of air injection system 223, and a product removal zone generally designated at the bottom of reservoir 220 by numeral 250. Air is injected into ammonium sulfate liquor reservoir 220 by air injection system 223. As shown, air injection system 223 consists of an air sparger arranged in a network of perforated pipes and receives oxidizing air from air blower 221 through suitable conduits 234.

In the apparatus of FIG. 2, the pH is maintained in the system to decrease the acidity of the sulfur dioxide absorbed in the ammonium sulfate solution. Aqueous ammonia injection system 243 consists of a network of conduits 245 to receive aqueous ammonia from pump 241 through suitable conduit 244. The aqueous ammonia is added to the stream of ammonium sulfate liquor containing absorbed sulfur dioxide where conduit 245 joins conduit 252 as it proceeds to circulating pump 224 and thereafter through conduit 225 to spraying system 214. Thus, the neutralization zone in the embodiment of FIG. 2 is located in the recirculation system from the point where conduit 245 joins conduit 252 and passes through pump 224 and conduits 225. The pH can be monitored by any suitable device and as shown in FIG. 2 is measured by pH monitor 280. Flowmeter 286 is connected to conduit 225 to monitor the flow of the ammonium sulfate solution/aqueous ammonia in conduit 225. Flowmeter 286 can be connected to control equipment (not shown) to control the flow of solutions through conduit 225. pH monitor 280 can be connected to control equipment (not shown) to control the amount of aqueous ammonia added by aqueous system 243 to the recirculation system designated by conduit 252, pump 224 and conduit 225. Bleed valve 278 and bleed line 226 are connected to conduit 225 to provide means for removing circulating liquor from conduit 225.

After the ammonium sulfate liquor containing absorbed sulfur dioxide is exposed to the oxidizing air in reservoir 220, it is recycled by recycle pump 224 through suitable conduits 225 from the bottom portion 250 of reservoir 220 through conduit 252 to absorption tower 210 where it is provided for the absorption of sulfur dioxide in the flue gas.

As shown in FIG. 2, flue gas 231 is introduced through gas inlet duct 212 and passes up into absorption tower 210, countercurrently contacting the ammonium sulfate/aqueous ammonia solution sprayed by spraying system 214. The sulfur dioxide contained in the flue gas is absorbed by the ammonium sulfate/aqueous ammonia solution and passes downwardly onto the surface of the liquor in reservoir 220. The flue gas having the sulfur dioxide removed therefrom, that is, the scrubbed flue gas, is exhausted to the atmosphere or to other suitable devices through mist eliminator 213 and outlet duct 211. The scrubbed flue gas is designated by numeral 232 as it exits outlet duct 211. As shown in FIG. 2, flue gas 231 is provided by oil burner 290. In the embodiment of FIG. 2, sulfur dioxide tank 294 has been added to the system through valve 296 to control the flow of sulfur dioxide gas from sulfur dioxide tank 294 through conduit 297 to flue gas duct 292. Flowmeter 298 monitors the flow of sulfur dioxide gas in conduit 297. Sulfur dioxide tank 294 has been added to the system of FIG. 2 for experimental purposes so that the sulfur dioxide in flue gas 231 can be increased to study the efficiency of the system of FIG. 2 in removing increased amounts of sulfur dioxide from flue gases. In an operating system for removing sulfur oxides from flue gases, the sulfur dioxide tank would be eliminated from the system. Furthermore, oil burner 290 is illustrated in FIG. 2 merely to illustrate the experimental source of flue gas for the particular system shown in FIG. 2. Sulfur dioxide analyzer 260 is connected to flue gas duct 292 near flue gas inlet 212 to monitor the sulfur dioxide content in the flue gas. Sulfur dioxide analyzer 260 is also connected by conduit 264 to spray tower 210 above mist eliminator 213 to measure and monitor the sulfur dioxide levels in the scrubbed gas 232 before it exits outlet duct 211.

As illustrated in FIG. 2, ammonium sulfate liquor is recirculated from the reservoir, by use of pump 224, to spray banks which break up the ammonium sulfate liquor into droplets. Aqueous ammonia is added to the ammonium sulfate liquor as it is recirculated from the reservoir to the spray banks to neutralize the liquor, that is, to reduce the acidity of the liquor as described above.

The gas to be de-sulfurized, that is, the flue gas, is introduced above the liquor reservoir and rises countercurrent to the falling droplets of ammonium sulfate/aqueous ammonia liquor which absorbs sulfur dioxide. The de-sulfurized gas passes through a mist eliminator to remove any entrained droplets and is then ready for discharge to the stack with or without re-heat. The sulfur dioxide-laden droplets fall into the reservoir of ammonium sulfate liquor which is aerated by sparging air through a suitable device, such as perforated pipes. Ammonia, in the form of aqueous solution, is added to the ammonium sulfate liquor containing absorbed sulfur dioxide as it is recirculated from the reservoir to the spray banks to maintain a solution of desired acidity. The product solution or suspension is withdrawn from the reservoir in the funnel-shaped portion of the reservoir designated by numeral 250 through conduit 252, valve 238 and conduit 237. The product can be placed in a storage pit or tank (not shown) for further processing.

The following specific examples describe the process of this invention. They are intended for illustrative purposes only and should not be construed as limiting the present invention.

The examples described below were carried out in an apparatus of pilot plant size as shown in FIG. 2. The source of the flue gas was an oil burner, and sulfur dioxide levels could be increased by the use of a sulfur dioxide tank appropriately metered and connected to the flue gas duct work.

EXAMPLE 1

Using an ammonium sulfate solution in the reservoir of the apparatus of FIG. 2, the sulfur dioxide removal efficiency was compared at various liquid to gas ratios. The results are shown in Table 1 below.

TABLE 1

| SO₂ REMOVAL EFFICIENCY VS. L/G RATIO AT HIGH pH | | | |
|---|---|---|---|
| EFFICIENCY % | 91.5 | 95 | 97 |
| L/G gal/1000 CFM | 54.5 | 74 | 91 |
| pH | 5.95 | 5.98 | 5.95 |
| INLET SO₂ ppm | 8100 | 8100 | 8100 |

From the data in Table 1, it can be seen that the sulfur dioxide removal efficiencies are very high and correlate with the liquid/gas ratio. Since not enough air could be added to the ammonium sulfate solution reservoir due to mechanical problems, oxidation was not complete, and the ammonium sulfite level in the liquor increased during the test. In addition to insufficient oxygen/sulfur dioxide ratio, oxidation was further hampered by poor air distribution in the oxidation column and reduced liquid column height due to the volume occupied by air.

EXAMPLE 2

Tests similar to those conducted in Example 1 above were carried out at reduced pH. The results are shown in Table 2.

TABLE 2

| SO₂ REMOVAL EFFICIENCY VS. L/G RATIO AT INTERMEDIATE pH | | | |
|---|---|---|---|
| EFFICIENCY % | 85 | 88 | 89 |
| L/G gal/1000 CFM | 46 | 67 | 92 |
| pH | 5.5 | 5.5 | 5.5 |
| INLET SO₂ ppm | 7500 | 7500 | 7500 |

The data of Table 2 show that sulfur dioxide removal was relatively high and correlated with liquid to gas ratio, but it was less pronounced than at the higher pH of Example 1. As in Example 1, oxidation of the sulfite was not complete in these test for the same reason as in Example 1, presumably due to physical limitations and not to chemical obstruction.

In another test, at a pH of 5.65 and a liquid to gas ratio of 53 gallons per 1000 CFM with 1180 ppm sulfur dioxide at the inlet, the sulfur dioxide removal efficiency was determined to be 85%. When air was added to the reservoir at the ratio of 3:1 oxygen per sulfur dioxide absorbed, the scrubbing liquid was fully oxidized, that is, no sulfite was present in the solution. No blue fume was noticed in the scrubbed gas outlet.

Although in accordance with the process of the present invention, the major product to be formed in the ammonium sulfate liquor reservoir is ammonium sulfate, other minor amounts of reaction products can also be formed, for example, small amounts of ammonium sulfite may be present in the liquor.

From the foregoing description, one skilled in the art can easily ascertain the essential characteristics of the present invention, and without departing from the spirit and scope thereof, can make various changes and modifications of the invention to adapt it to various other uses and conditions.

What is claimed is:

1. A multi-step process for treating a gas containing a sulfur oxide in a single vessel comprising:
   (a) passing the gas containing sulfur oxide through a spray of aqueous ammonium sulfate in the vessel to form an aqueous ammonium sulfate having sulfur oxide absorbed therein and a scrubbed gas;
   (b) collecting in a reservoir in the vessel the aqueous ammonium sulfate having sulfur oxide gas absorbed therein;
   (c) introducing aqueous ammonia into the aqueous ammonium sulfate having sulfur oxide gas absorbed therein;
   (d) introducing an oxygen-containing gas into the aqueous ammonium sulfate having sulfur dioxide absorbed therein in the reservoir whereby ammonium sulfate product is formed in the reservoir by the reaction of the absorbed sulfur oxide gas with the ammonia in the aqueous ammonia and the oxygen in the oxygen-containing gas;
   (e) forming the spray of aqueous ammonium sulfate through which the gas containing sulfur oxide is passed, from aqueous ammonium sulfate liquor removed from the reservoir;
   (f) withdrawing scrubbed gas; and
   (g) withdrawing ammonium sulfate product.

2. The process of claim 1 further comprising adding water to adjust the concentration of ammonium sulfate in the aqueous ammonium sulfate.

3. The process of claim 2 wherein the water is added to the aqueous ammonium sulfate with the aqueous ammonia.

4. The process of claim 1 wherein the sulfur oxide is sulfur dioxide.

5. The process of claim 1 wherein the oxygen-containing gas is air.

6. The process of claim 1 wherein the amount of ammonia introduced as aqueous ammonia into the aqueous ammonium sulfate is an amount sufficient to reduce the acidity of the aqueous ammonium sulfate having sulfur oxide absorbed therein.

7. The process of claim 6 wherein the amount of ammonia introduced as aqueous ammonia into the aqueous ammonium sulfate is sufficient to prevent the loss of free ammonia from the aqueous ammonium sulfate.

8. The process of claim 1 wherein the pH of the aqueous ammonium sulfate is maintained at less than about 6.0 by the ammonia added to the aqueous ammonium sulfate in the form of aqueous ammonia.

9. The process of claim 1 wherein the pH of the aqueous ammonium sulfate is maintained at less than about 5.5 by the ammonia added to the aqueous ammonium sulfate in the form of aqueous ammonia.

10. The process of claim 1 wherein the ammonium sulfate product comprises ammonium sulfate crystals.

11. The process of claim 1 wherein the ammonium sufate product comprises saturated aqueous ammonium sulfate solution.

12. The process of claim 1 wherein the aqueous ammonia is introduced into the aqueous ammonium sulfate in the reservoir.

13. The process of claim 1 wherein the aqueous ammonia is introduced into the aqueous ammonium sulfate liquor removed from the reservoir prior to forming the spray of aqueous ammonium sulfate therefrom.

14. A process for the removal of sulfur dioxide from a sulfur dioxide-containing gas and the simultaneous production of ammonium sulfate in a single vessel having an ammonium sulfate scrubbing zone; an ammonium sulfate liquor reservoir having a sulfur dioxide oxidation zone and a product removal zone; and a scrubbed gas removal zone comprising:
   (a) introducing a sulfur dioxide-containing gas into the ammonium sulfate scrubbing zone;
   (b) introducing aqueous ammonium sulfur liquor circulated from the ammonium sulfate liquir reservoir into the ammonium sulfate scrubbing zone whereby the sulfur dioxide in the sulfur dioxide-containing gas is absorbed by the aqueous ammonium sulfate liquor to form a scrubbed gas;
   (c) withdrawing scrubbed gas from the scrubbed gas removal zone;
   (d) collecting the aqueous ammonium sulfate liquor having sulfur dioxide absorbed therein in the ammonium sulfate liquor reservoir;
   (e) introducing aqueous ammonia into a neutralization zone in the ammonium sulfate liquor reservoir or in the aqueous ammonium sulfate liquor circulated from the reservoir to the scrubbing zone;
   (f) introducing an oxygen-containing gas into the sulfur dioxide oxidation zone in the ammonium sulfate liquor reservoir; and
   (g) removing ammonium sulfate product from the product removal zone of the ammonium sulfate liquor reservoir.

15. The process of claim 14 further comprising adding water to adjust the concentration of ammonium sulfate in the aqueous ammonium sulfate liquor.

16. The process of claim 15 wherein the water is introduced into the ammonium sulfate scrubbing zone.

17. The process of claim 14 wherein the water is added to the ammonium sulfate liquor reservoir.

18. The process of claim 14 wherein the aqueous ammonium sulfate liquor contains ammonium sulfate crystals.

19. The process of claim 14 wherein the sulfur dioxide-containing gas is a flue gas.

20. The process of claim 14 wherein the oxygen-containing gas is air.

21. The process of claim 14 wherein a sufficient amount of aqueous ammonia is added in the neutralization zone to maintain the pH of the ammonium sulfate liquor at less than about 6.0.

22. The process of claim 14 wherein a sufficient amount of aqueous ammonia is added in the neutralization zone to maintain the pH of the ammonium sulfate liquor at less than about 5.5.

23. The process of claim 14 wherein a sufficient amount of aqueous ammonia is added to the ammonium sulfate reservoir to maintain the pH of the ammonium sulfate liquor at a value which prevents the excessive loss of ammonia gas.

24. The process of claim 14 wherein a sufficient amount of aqueous ammonia is added to the ammonium sulfate reservoir to reduce the acidity of the ammonium sulfate liquor containing absorbed sulfur dioxide.

25. The process of claim 14 further comprising agitating the ammonium sulfate solution in the product removal zone to maintain a slurry of ammonium sulfate crystals in the ammonium sulfate solution.

26. The process of claim 25 wherein the agitation of the ammonium sulfate solution in the product removal zone is controlled to prevent the backward flow of the ammonium sulfate solution into the sulfur dioxide oxidation zone.

* * * * *